March 13, 1928.
P. CANDREVA
PLOW
Filed Sept. 22. 1926
1,662,636
4 Sheets-Sheet 1
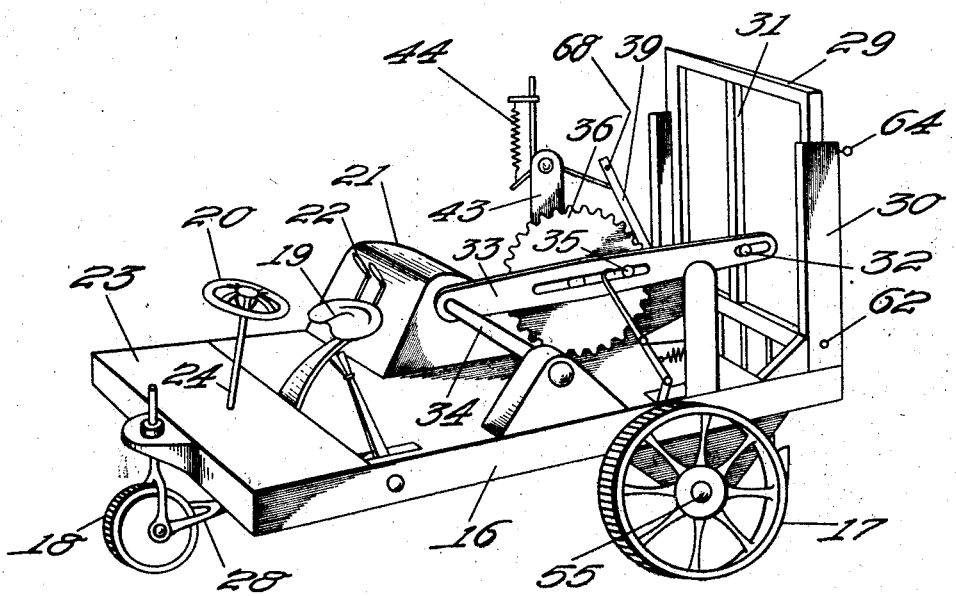
FIG. 1
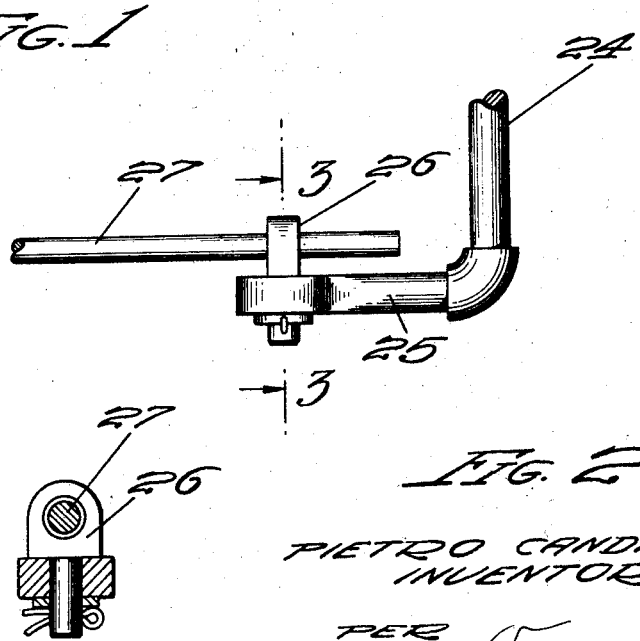
FIG. 2
FIG. 3
PIETRO CANDREVA
INVENTOR
PER
Dominic H. Valens
ATTORNEY March 13, 1928.

P. CANDREVA

PLOW

Filed Sept. 22, 1926    4 Sheets-Sheet 2

PIETRO CANDREVA
INVENTOR

PER
Dominic H. Valente
ATTORNEY

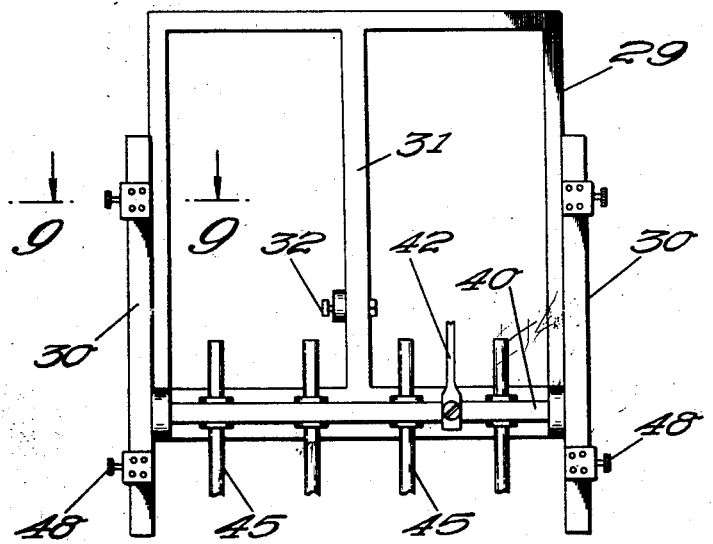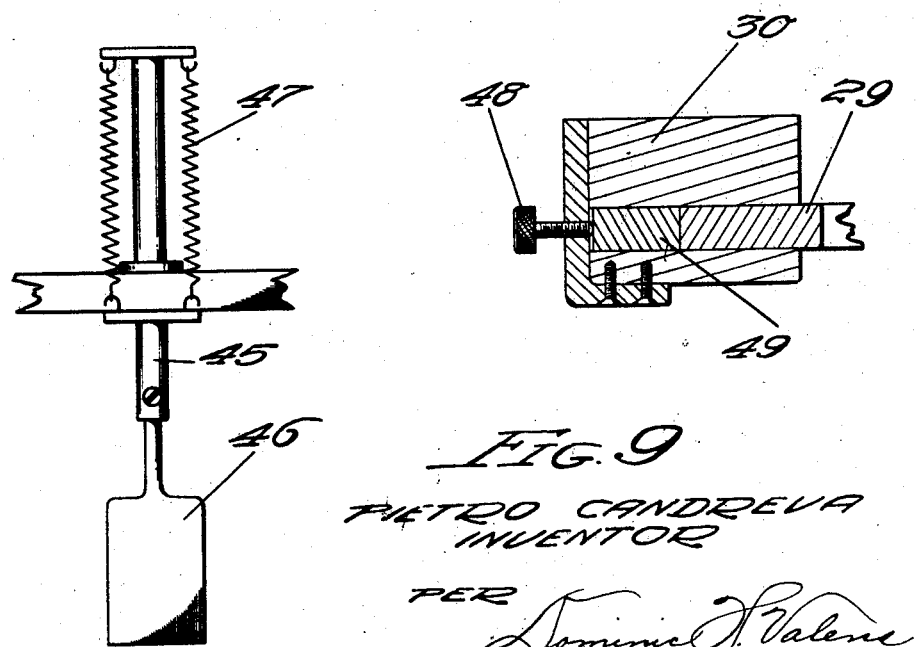

March 13, 1928.
P. CANDREVA
PLOW
Filed Sept. 22, 1926
1,662,636
4 Sheets-Sheet 4
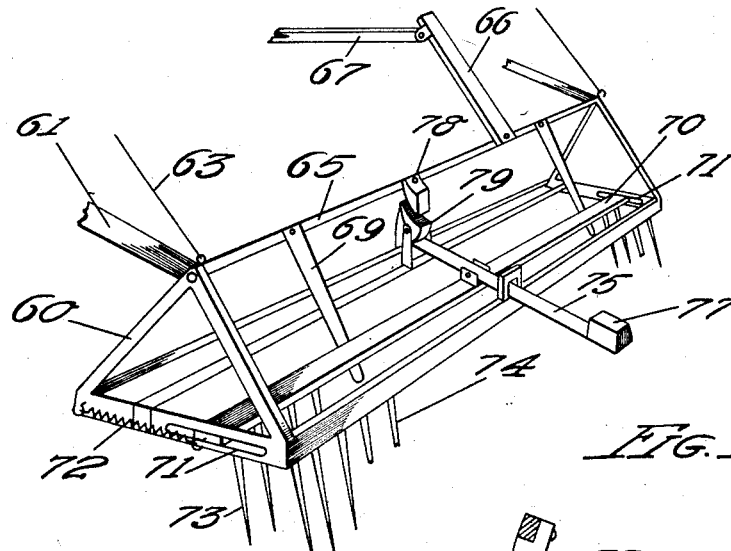
Fig. 10
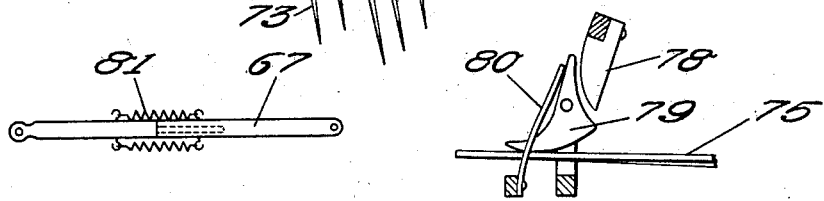
Fig. 11
Fig. 12
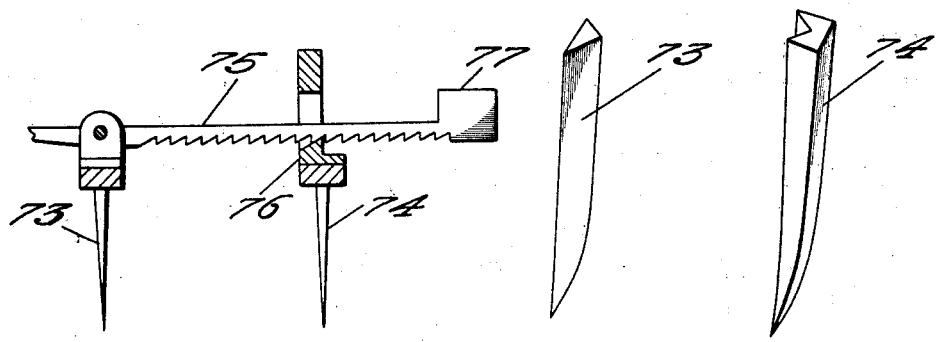
Fig. 13
Fig. 14
Fig. 15
PIETRO CANDREVA
INVENTOR
PER
Dominic H. Valens
ATTORNEY Patented Mar. 13, 1928.

1,662,636

UNITED STATES PATENT OFFICE.

PIETRO CANDREVA, OF CHICAGO, ILLINOIS.

PLOW.

Application filed September 22, 1926. Serial No. 136,937.

This invention relates to improvements in plowing machines, and has for one of its principal objects the provision of a plow, or the like, which shall be mechanically operated and which will perform the labor of a number of men, in a satisfactory and economical manner.

One of the important objects of this invention is to provide a motor driven, or tractor drawn, plow which will work upon the earth to make furrows, or till the soil for other purposes, as desired, and a still further object is the balancing of the stresses and strains to which the machine is subjected in the performance of its work.

Another and further important object of this invention is to provide in an improved plow the combination of a forward and a digging movement, which can be controlled both as to speed and extent by the operator of the device, who also guides the machine in any desired direction over the field.

Still another and further important object of this invention is to provide in a gang-plow for use with either self-contained motive power, or for use with a tractor, a plurality of plowshares, which are operated in such a manner as to eliminate any possibility of breakage, or damage in the event of their striking a large stone or perhaps a stump in the operation of the machine.

A further object of this invention is to provide in the combination with a plow for digging or cultivating the earth, a means for removing plants, weeds, straw, and similar material, including débris, from the path of the plowshares.

Other and important objects of this invention will be apparent from the disclosures in the accompanying drawings and following specification.

The invention in a preferred form is illustrated in the drawings and hereinafter more fully described.

In the drawings:

Figure 1 is a perspective view of the improved plow of this invention.

Figure 2 is a detail view, showing a portion of the steering gear.

Figure 3 is a vertical section, taken on the line 3—3 of Figure 2.

Figure 7 is a vertical elevation of a portion of the front of the machine, showing the vertical movable frame which supports the plowshares or similar elements.

Figure 8 is a detail view of the lower portion of the structure shown in Figure 7, illustrating means for removably detaching the earth cultivating blades, and also depicting a modification.

Figure 9 is a horizontal section taken on line 9—9 of Figure 7.

Figure 10 is a perspective view of an attachment for the apparatus, this attachment to be used for removing débris, from its path.

Figure 11 is a detail view of the operating bar for the apparatus shown in Figure 10.

Figure 12 is a detail view of a portion of the mechanism illustrated in Figure 10.

Figure 13 is a detail view of another part of the device shown in Figure 12.

Figures 14 and 15 are perspective views of the teeth used on the machine illustrated in Figure 10.

As shown in the drawings:

Figure 4:
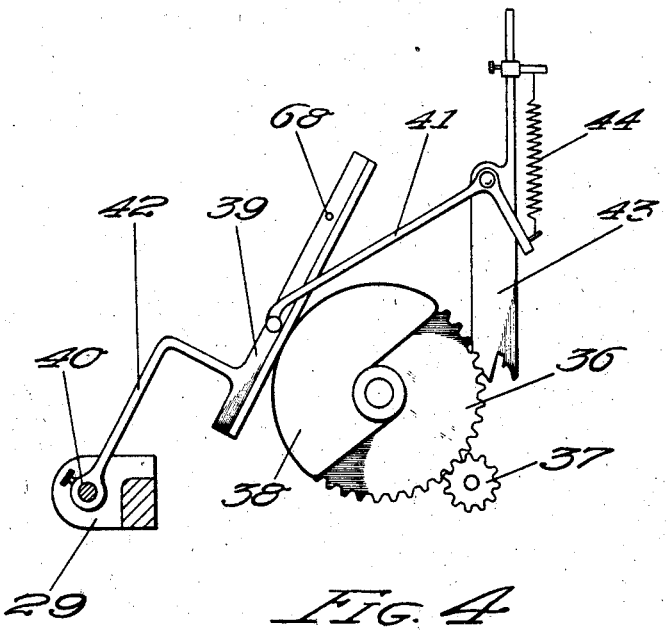
Figure 4 is a side elevation showing in detail the cam mechanism for operating the plowshares in a forward and backward movement.
Figures 5, 6:
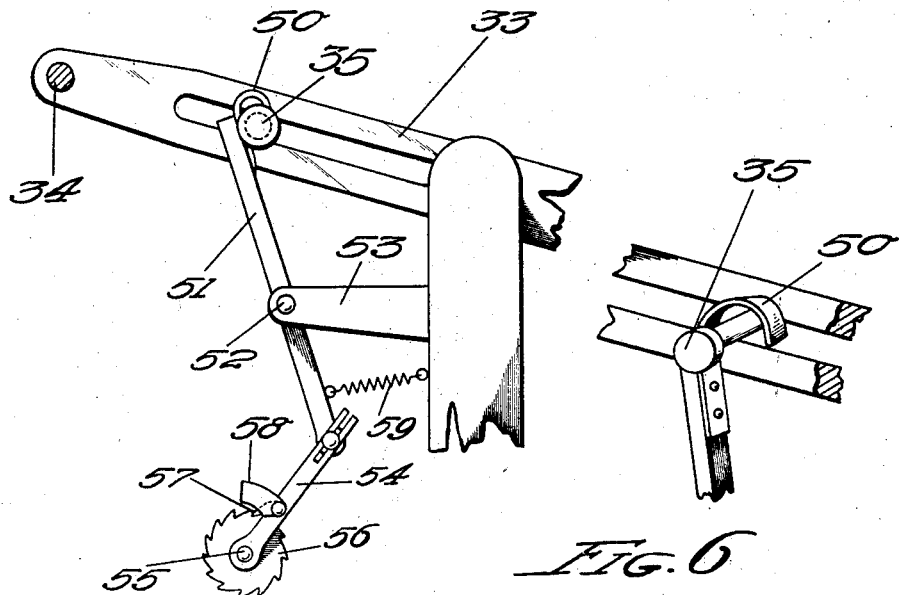
Figure 5 is a detail view of the wheel driven mechanism for accomplishing the vertical reciprocating movement of the plowshares.
Figure 6 is a detail view of a portion of the mechanism illustrated in Figure 5.

The reference numeral 16 illustrates generally the frame, or it might be called the chassis, of the improved plow mechanism of this invention. This frame is provided with a pair of combination supporting and operating wheels 17 and with a steering wheel 18. The apparatus may be drawn or propelled by a tractor, or if desired, may have a self-contained motor for its operation.

A seat 19 for the operator is provided, as shown in Figure 1, this being conveniently located adjacent a steering wheel 20 and also adjacent to a control box 21, which has a plurality of operating levers 22, mounted therein. If desired, an additional seat may be positioned on a platform 23, thereby providing for either a forward or reverse driving position, as desired.

As shown in Figures 1 and 2 the steering wheel 20 is mounted on a steering column 24, which projects downwardly thru the platform 23 and terminates in a horizontal extension 25 in the end of which is swivelled a pin and connecting member 26; thru an opening in the connecting member 26, passes a bar 27 which is bifurcated at its outer end as shown at 28 in Figure 1, and in that way is connected to steering wheel 18.

As best shown in Figures 1 and 7, the plowshares are similar earth cutting members, suspended from a frame 29 which is slidably mounted for a vertical and reciprocating operation in a pair of supports 30.

A vertical reinforcing member 31 forms part of the frame 29 and to this is attached a pin 32, which operates in a slot in one end of a beam 33, the other end of said beam being pivoted on a shaft 34, extending transversely of the machine, as shown in Figure 1.

Beam 33 is operated by means of a pin 35, mounted in a slot in the middle of the beam, the pin 35 being eccentrically positioned upon the side of the gear wheel 36, which in turn is driven by a pinion 37, preferably operated by motor to be positioned upon the plow. It is obvious that this pinion 37 may be driven from the axle if the plow is propelled by a tractor.

Attached to one face of the gear wheel 36 is a cam 38, as best shown in Figure 4. Adapted to ride on cam 38 is a bar 39 having an L-shaped extension 42, the end of which is fixed to a transversely extending shaft 40, mounted in the frame 29. Also attached to the bar 39 is a bell-crank-lever 41, pivotally mounted on a support 43, and at the free end of this bell-crank-lever, is attached a helical spring 44, which operates to maintain the bar 39 in contact with the cam 38 at all times. The bar 39 and its attached member 42 ride up and down with the frame 29, and the action of the cam 38 causes the plowshares supporting the bars 45 to assume an outward and upward motion after a downward digging motion.

As shown in Figure 8, several blades or plowshares, or similar earth cultivating elements, can be removably mounted in the supporting bars 45, and if desired each of these supporting bars can be resiliently maintained in position, by means of a set of springs, as shown at 47. The frictional motion of the frame 29 in the support 30 can be adjusted by means of a series of set screws 48, acting on adjusting blocks 49, as shown in Figure 9.

The pin 35 extends outwardly some distance from the gear 36 and adapted to move with this pin, thru the upper arc of its movement, is a hook 50 attached to a bar 51, pivotally mounted at 52 on a support 53. This bar operates a lever 54, pivotally mounted on the axle 55 of the machine. Attached to the axle is a ratchet 56, and a pawl 57 operates in this ratchet, being controlled by weight 58.

It will be obvious that the reciprocating motion of the bar 51, which takes place thru the upper semi-circle arc of movement of the pin 35, will act and impart a step by step forward turning movement to the axle 55 and the wheel 17. A ratchet similar to that illustrated at 56 may also be positioned on the axle and adapted for a reverse operating movement of the pawl 57. A spring 59 maintains the bar 51 and its attachments in operating position.

A raking device is adapted to be removably positioned upon the gang plow, and comprises a frame 60, shown in Figure 10 slung from supports 61, adapted to be mounted by means of bolts in suitable opening 62 in the upright 30, as shown in Figure 1. Supporting guy wires 63 are also fastened to the frame 60 and have their upper ends attached to hooks 64 on the frame member 30.

A rotatable bar 65 extends transversely of the frame 60 and is operated by means of a lever 66 attached thereto, the upper end of this lever being connected to a link 67, the other end of which is attached by means of a bolt or the like to the bar 39, this attachment being made thru a suitable opening 68 in said bar. The link 67 is made in two pieces held together by springs 81 so as to provide for a resilient drive. This construction is best shown in Figure 11.

Action of the member 39 on the cam 38 will then accordingly rotate the bar 65 which has downwardly extending levers 69 attached thereto, which in turn will operate a rake bar 70, mounted for horizontal sliding motion in a pair of slots 71 in the lower member of the frame 60. A pair of springs 72 are attached to this rake bar 71, adapted to normally retain the same in retracted position.

Teeth 73 project downwardly from the rake bar 70 as shown in Figure 14, are of triangular cross section. These teeth are adapted to co-operate and interfit with corresponding teeth 74, shown in Figure 15. These last described teeth being mounted on the frame 60.

As the bar 70 is pushed rearward in the slots 71, a rack 75 attached thereto also rides forwardly over a tooth affixed to the bar which supports the teeth 74. A weight 77 is mounted on the forward end of the rack bar 75 and this will act to maintain the teeth 73 in close co-operative relation with the teeth 74 even against the tension springs 72. In order to return the bar 70 to its normal position, a cam 78 is affixed to the rotatable shaft 65, which operates a trip 79, as shown in Figure 12. This trip acting to raise the teeth of the rack bar 75 from teeth 76, when the fingers 69 have approximately reached their rearmost position on the return stroke, thereby allowing the bar 70 with its attached teeth 73 to snap forward into its original position. A leaf spring 80 maintains the trip 79 in normal position.

It will be seen that herein is provided a plow mechanism which digs up earth and moves it forwardly at the same time, thru a combination of simple movements. The plow itself being actuated in a series of regular progressions, and capable of either forward or reverse movement. Further means for removing hay, weeds or even growing crops and similar material, from the path of the plow, is provided in the form of a removable attachment; this attachment depositing such material in regular rows.

I am aware that many changes may be made and numerous details of construction varied throughout a wide range without departing from the spirit of this invention, and I therefore do not purpose limiting the patent granted hereon otherwise than as necessitated by the prior art.

I claim as my invention:

1. In a soil treating tool means for supporting a plurality of plowshares for combined vertical and reciprocating movement said means comprising a vertically movable frame, and means for imparting a vertical reciprocating motion to said frame said means comprising a beam, a slot in the beam, a driven gear wheel and a pin on the gear wheel operating in said slot.

2. In a soil treating tool means for supporting a plurality of plowshares for combined vertical and reciprocating movement said means comprising a vertically movable frame, and means for imparting a vertical reciprocal motion to said frame, said means comprising a beam, a slot in the beam, a driven gear wheel and a pin on the gear wheel operating in said slot, and means operated by said gear wheel for imparting a series of movements to the plow.

3. In a soil treating tool for supporting a plurality of plowshares for combined vertical and reciprocating movement and said means comprising a vertically movable frame, and a plowshare supporting axle rotatably mounted in the frame, and means for imparting a reciprocable vertical motion to the frame and intermittent reciprocating turning movement to the axle.

4. In a soil treating tool for supporting a plurality of plowshares for combined vertical and reciprocating movement and said means comprising a vertically movable frame, and a plowshare supporting shaft rotatably mounted in the frame, and means for imparting a reciprocable vertical motion to the frame and intermittent reciprocating turning movement to the shaft, said means comprising an eccentrically operated lever for the frame and a cam operated lever for the shaft.

In testimony whereof I affix my signature.

PIETRO CANDREVA.